United States Patent [19]

Kick

[11] 3,859,817
[45] Jan. 14, 1975

[54] AUXILIARY COOLING SYSTEM FOR ENGINE OF AIR CONDITIONED MOTOR VEHICLE

[75] Inventor: Charles L. Kick, Westwood, N.J.

[73] Assignee: The Raymond Lee Organization, Inc., New York, N.Y.; a part interest

[22] Filed: Sept. 4, 1973

[21] Appl. No.: 394,179

Related U.S. Application Data

[63] Continuation-in-part of Ser. No. 281,385, Aug. 17, 1972, abandoned.

[52] U.S. Cl. .............. 62/244, 123/41.19, 62/243, 62/239, 165/42, 165/43
[51] Int. Cl. ............................................. B60h 3/04
[58] Field of Search .......... 123/41.19; 62/243, 244, 62/239; 165/42, 43

[56] References Cited
UNITED STATES PATENTS

| 2,070,379 | 2/1937 | Stranfaglia | 62/243 |
| 2,506,758 | 5/1950 | Woodruff | 62/428 |
| 2,541,921 | 2/1951 | Henney | 62/428 |
| 2,902,838 | 9/1959 | Nichols | 62/244 |
| 3,203,476 | 8/1965 | McMahan | 165/42 |
| 3,280,896 | 10/1966 | Goodson | 165/43 |

*Primary Examiner*—William J. Wye
*Attorney, Agent, or Firm*—Daniel Jay Tick

[57] ABSTRACT

A perforated tube is mounted in the area of the engine cooling radiator of a motor vehicle. An insulated conduit directs cold air from the air conditioner of the vehicle to the perforated tube so that the perforated tube directs the cold air onto the radiator. A control device enables the driver to provide auxiliary cooling of the engine with the cold air.

4 Claims, 4 Drawing Figures

PATENTED JAN 14 1975
3,859,817
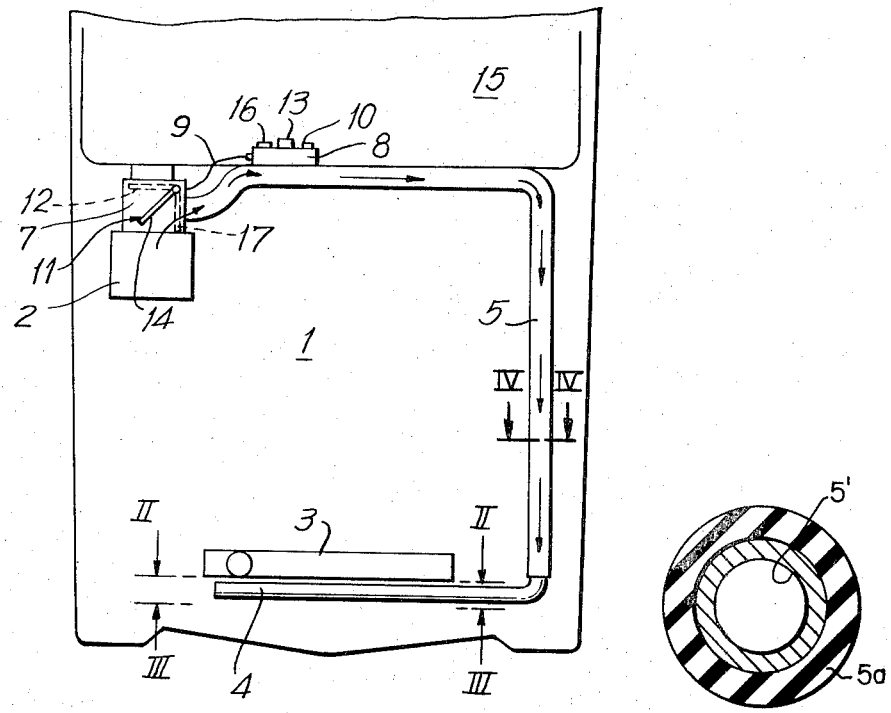
FIG. 1
FIG. 4
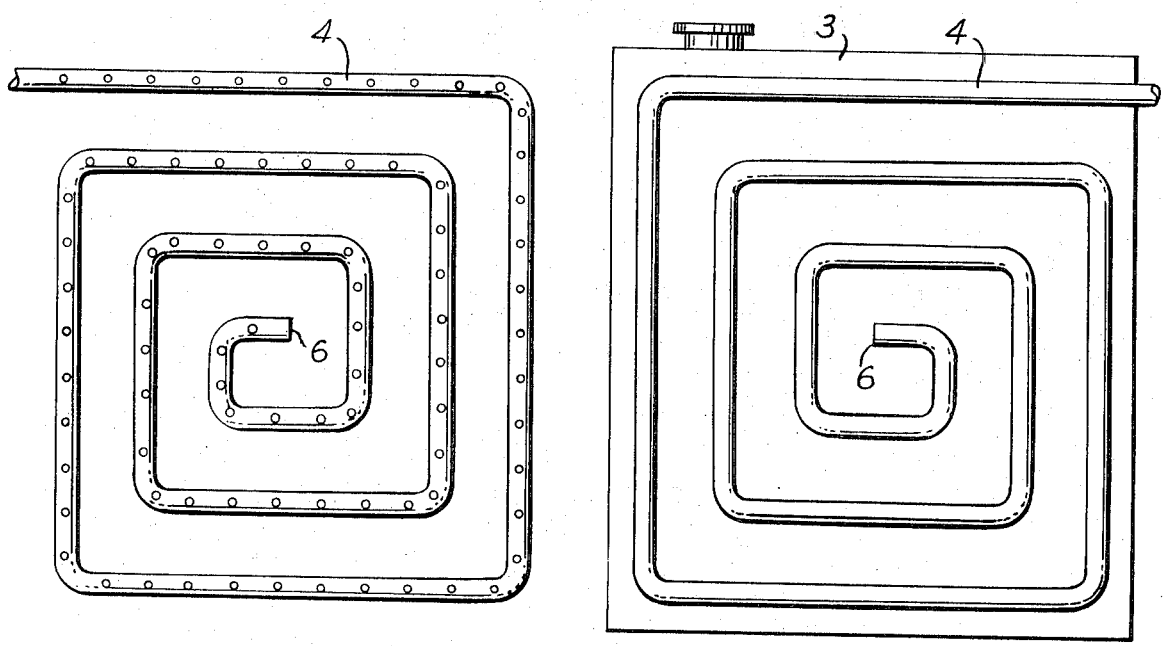
FIG. 2
FIG. 3

AUXILIARY COOLING SYSTEM FOR ENGINE OF AIR CONDITIONED MOTOR VEHICLE

DESCRIPTION OF THE INVENTION

The present application is a continuation-in-part of application Ser. No. 281,385, filed Aug. 17, 1972, now abandoned, for "Auxiliary Cooling System for Engine of Motor Vehicle."

The present invention relates to an auxiliary cooling system for an engine. More particularly, the invention relates to an auxiliary cooling system for the engine of an air conditioned motor vehicle.

The principal object of the invention is to provide an auxiliary cooling system of simple structure, which is efficient, effective and reliable in operation, for the engine of an air conditioned motor vehicle.

An object of the invention is to provide an auxiliary cooling system for the engine of an air conditioned motor vehicle, which system is readily installable in new and existing vehicles.

In order that the invention may be readily carried into effect, it will now be described with reference to the accompanying drawing, wherein:

FIG. 1 is a top view of a first embodiment of the auxiliary cooling system of the invention;

FIG. 2 is a view, taken along the line II—II, of FIG. 1;

FIG. 3 is a view, taken along the lines III—III, of FIG. 1; and

FIG. 4 is a cross-sectional view, on an enlarged scale, taken along the lines IV—IV, of FIG. 1.

In the FIGS., the same components are identified by the same reference numerals.

The auxiliary cooling system of the invention cools the engine of an air conditioned motor vehicle 1 having an air conditioner 2 and an engine cooling radiator 3 (FIG. 1).

The auxiliary cooling system of the invention comprises a perforated tube 4 (FIGS. 1, 2 and 3) mounted in the area of the radiator 3. A conduit 5 directs cold air from the air conditioner 2 to the perforated tube 4 whereby said perforated tube directs the cold air onto the radiator 3. The conduit 5 is covered with thermal insulations 5a (FIG. 4).

The perforated tube 4 is wound in a substantially spiral configuration. The free end 6 of the perforated tube 4 (FIGS. 2 and 3) is closed to provide a pressure buildup so that the cold air is directed through the perforations of the tube onto the radiator 3.

A control device enables the driver (not shown in the FIGS.) to provide and control auxiliary cooling of the engine with the cold air. In the illustrated embodiment (FIG. 1), the control device comprises a driver-controlled baffle 7 between the air conditioner 2 and the conduit 5. The baffle 7 has a plurality of positions to divert different volumes of cold air to the conduit 5 under the control of the driver. The baffle 7 may be controlled by any suitable means such as, for example, electromagnetic means controlled via a control panel 8 and electrically connected to said panel via an electrically conductive lead 9.

When the driver closes push button switch 10 of the panel 8, for example, the baffle plate 11 may be moved to its position 12, in which all the cold air is diverted to the conduit 5. When the driver closes the switch 13 of the panel 8, for example, the baffle plate 11 may be moved to its position 14 in which cold air is diverted to both the interior 15 of the vehicle and the conduit 5. When the driver closes the switch 16 of the panel 8, for example, the baffle plate 11 may be moved to its position 17 in which all the cold air is directed into the interior 15 of the vehicle 1.

While the invention has been described by means of specific examples and in specific embodiments, I do not wish to be limited thereto, for obvious modifications will occur to those skilled in the art without departing from the spirit and scope of the invention.

I claim:

1. An auxiliary cooling system for an engine of an air conditioned motor vehicle having air conditioning means and an engine cooling radiator, said auxiliary cooling system comprising a perforated tube wound in a substantially planar spiral configuration and positioned in the area of the radiator;

insulated conduit means coupled between the air conditioning means and the perforated tube for directing cold air from the air conditioning means into the perforated tube whereby said perforated tube directs the cold air onto the radiator; and control means enabling the driver to provide auxiliary cooling of the engine via the perforated tube and cold air therein.

2. An auxiliary cooling system as claimed in claim 1, wherein the control means comprises a driver-controlled baffle between the air conditioning means and the conduit means, said baffle having a plurality of positions to divert different volumes of cold air to said conduit means under the control of the driver.

3. An auxiliary cooling system as claimed in claim 1, wherein the control means comprises means for opening the conduit means to the conditioning means and providing on and off means in the conduit, said on and off means having open and closed positions to direct cold air from the air conditioning means to the perforated tube via said conduit means.

4. An auxiliary cooling system as claimed in claim 1, wherein the perforated tube is closed at its free end.

* * * * *